United States Patent [19]
> Rube et al.

[11] 3,811,760
[45] May 21, 1974

[54] OPERATING MECHANISM FOR MOTION PICTURE PROJECTORS

[75] Inventors: Helmut Rube, Grunbach; Fritz Krumbein, Stuttgart-Moehringen, both of Germany

[73] Assignee: Robert Bosch Photokino GmbH, Stuttgart, Germany

[22] Filed: Jan. 19, 1973

[21] Appl. No.: 325,013

[30] Foreign Application Priority Data
Jan. 21, 1972   Germany............................ 2202778

[52] U.S. Cl................................. 352/157, 352/178
[51] Int. Cl............................................. G03b 1/56
[58] Field of Search ............ 352/157, 158, 159, 178

[56] References Cited
UNITED STATES PATENTS
3,656,703   4/1972   Vockenhuber .................... 352/157

Primary Examiner—Monroe H. Hayes
Attorney, Agent, or Firm—Michael S. Striker

[57] ABSTRACT

A motion picture projector wherein the setting for forward or reverse transport of film are selected by a first rotary knob and the film threading unit is started in response to turning of a second rotary knob from an inoperative position. A blocking pawl holds the second knob against movement from the inoperative position whenever the first knob is out of its starting position in which the claw pull-down is idle. The second knob is held in its operative position by a detent which is rigid with the blocking pawl. The detent is disengaged from the second knob by a roller of the film threading unit which is shifted by the film upon completion of a threading operation whereby a spring returns the second knob to its inoperative position. The actuation of the film threading unit can be interrupted by manually rotating the second knob from its operative position.

18 Claims, 4 Drawing Figures

OPERATING MECHANISM FOR MOTION PICTURE PROJECTORS

BACKGROUND OF THE INVENTION

The present invention relates to cinematographic apparatus in general, especially to motion picture projectors, and more particularly to improvements in operating mechanisms for motion picture projectors of the type embodying a film threading unit. Still more particularly, the invention relates to improvements in motion picture projectors wherein the film threading unit can be started by a discrete knob, lever, wheel or analogous actuating member.

Presently known operating mechanisms of the just outlined character exhibit a number of drawbacks. Thus, in certain conventionel motion picture projectors, the actuating member which serves to start the automatic film threading unit can be operated by a careless or ignorant person while the projector is in use, i.e., while the claw pull-down or an analogous film transporting device draws the film from the supply reel in a cassette or transports the film rearwardly. This can result in damage to the film and/or to component parts of the projector.

SUMMARY OF THE INVENTION

An object of the invention is to provide a cinematographic apparatus, especially a motion picture projector, with a novel and improved operating mechanism which automatically prevents the actuation of film threading unit as soon as the apparatus assumes a state or condition in which the actuation of film threading unit could result in damage to the film and/or to component parts of the apparatus.

Another object of the invention is to provide an operating mechanism which enables the user to interrupt the film threading operation before the leader of motion picture film reaches the takeup reel or before the leader is advanced through a distance which suffices to move it into the range of the film transporting mechanism.

A further object of the invention is to provide an operating mechanism which includes discrete actuating means for respectively changing the setting of the cinematographic apparatus and for actuating the film threading unit with a novel and improved connection between the two actuating means.

An additional object of the invention is to provide a simple, compact, rugged and reliable mechanism which allows for such operation of a motion picture projector that the film threading unit can be actuated only when its actuation cannot adversely affect the film and/or the condition of the apparatus and which enables the user to interrupt the actuation of film threading unit at will without the exertion of a substantial effort.

Still another object of the invention is to provide the operating mechanism for a motion picture projector with actuating means for the film threading unit which automatically reassumes an inoperative position in response to completed threading of motion picture film as well as when a careless or inexperienced user changes the condition of the apparatus so that further actuation of the film threading unit is not only undesirable but might result in damage to or breakdown of the apparatus.

The invention is embodied in a cinematographic apparatus, particularly in a motion picture projector, which comprises first actuating means (e.g., a rotary knob) which is operable to change the setting of the apparatus from at least one first state or condition to at least one second state (the first state may be the quiescent condition of the apparatus and the second state may be that when the apparatus is set to transport the film forwardly or rearwardly), preferably automatic film threading means which is actuatable to transport the leader of motion picture film along a predetermined path (for example, to transport the leader from the interior of a properly inserted or mounted cassette to the core of a takeup reel or into the range of a claw pull-down), second actuating means (such as a second rotary knob) which is movable from an inoperative position to an operative position to thereby actuate the film threading means, and blocking means (e.g., the pallet or tooth of a bell crank lever) which is responsive to operation of the first actuating means to thereby lock the second actuating means in its inoperative position so that the film threading means can be actuated only in the first state of the apparatus, namely, in that state when the actuation of film threading means cannot result in damage to motion picture film and/or in damage to component parts of the apparatus.

The apparatus preferably further comprises detent means (e.g., a suitably configured projection or lobe of the aforementioned bell crank lever) for yieldably holding the second actuating means in its operative position. In accordance with a feature of the invention, the second actuating means is movable by hand from its operative position back to inoperative position against the opposition of the detent means to thereby interrupt the actuation of film threading means.

As a rule, the tension of motion picture film changes in response to transport of its leader through a predetermined distance along the path defined by the film threading means, for example, through a distance which is necessary to couple the leader to the core of the takeup reel or to move the leader into the range of the claw pull-down. The film threading means may comprise a detector (e.g. a roller which is shifted by the film upon completed transport of the leader of motion picture film through the predetermined distance) which is responsive to changes in the tension of motion picture film and serves to disengage the detent means from the second actuating means so that the second actuating means is free to reassume its inoperative position and to thus terminate the actuation of film threading means. A spring or other suitable resilient means may be provided for permanently urging the second actuating means to its inoperative position; such resilient means should not be strong enough to overcome the retaining action of the detent means except when the detector effects a change in the position of the detent means so that the resilient means is then free to return the second actuating means to its inoperative position in which the second actuating means remains unless moved by hand and in which the second actuating means may be locked by the blocking means as soon as the first actuating means is operated to change the setting of the apparatus from the first to a second state.

The novel features which are considered as characteristic of the invention are set forth in particular in the appended claims. The improved operating mechanism itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
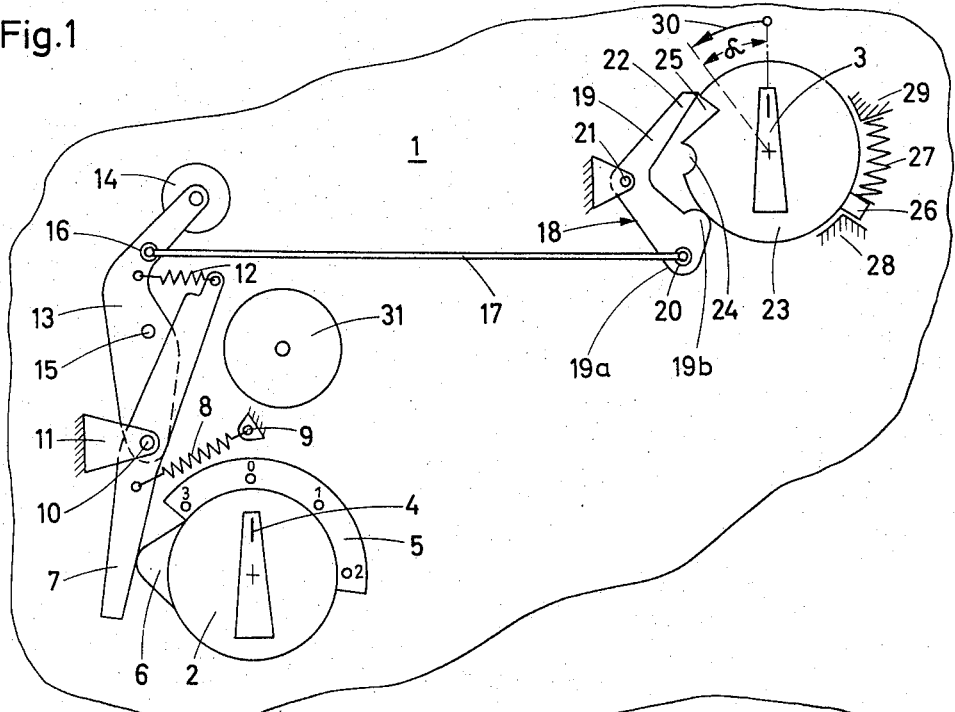
FIG. 1 is a somewhat schematic elevational view of the operating mechanism which is shown as being installed in a motion picture projector, the first and second actuating means being respectively shown in their starting and inoperative positions.

Referring first to FIG. 1, there is shown a portion of a motion picture projector which comprises a housing 1 rotatably supporting a first or main actuating member 2 and a second or auxiliary actuating member 3. The main actuating member 2 (hereinafter called knob for short) has an index 4 which is movable along the graduations of a fixed scale 5. These graduations indicate various states or conditions of the projector, such as the state for operation with forward transport of motion picture film at normal speed, with rapid rewinding of film, with stoppage of film and with rapid forward transport. The shank of the knob 2 is rigidly connected with a cam 6 for a two-armed follower lever 7 which can pivot about the axis of a pin 10 secured to a bracket 11 in the housing 1. A resilient element in the form of a helical spring 8 is attached to a post 9 in the housing 1 and serves to bias the lower arm of the follower lever 7 against the periphery of the cam 6.

The pivot pin 10 further serves as a fulcrum for a one-armed carrier lever 13 which rotatably supports a roller-shaped film engaging detector 14 for monitoring changes in tension of motion picture film F (see FIG. 3) and is coupled to the upper arm of the follower lever 7 by a helical spring 12. The carrier lever 13 is further provided with a stop 15 for the upper arm of the follower lever 7 and is articulately connected (as at 16) with one end of a link 17. The other end of the link 17 is articulately connected with the lower arm 19a of a supporting member here shown as a bell crank lever 18 which is pivotable in the housing 1 about the axis of a fixed pin 21. The lower arm 19a of the bell crank lever 18 has a detent here shown as a rounded projection or lobe 19b which can enter a complementary recess or notch 24 in the periphery of a disk 23 forming part of the second actuating member 3. The upper arm 19 of the bell crank lever 18 has a blocking or arresting pallet 22 which can enter a complementary recess or notch 25 in the periphery of the disk 23.

The disk 23 is further provided with a radially outwardly extending projection or stud 26 which is biased by a return spring 27 so that it normally abuts against a stop 28 in the housing 1. The spring 27 reacts against a stationary retainer 29 of the housing 1. The arrow 30 indicates the direction in which the actuating member 3 must be turned by hand in order to actuate the automatic film threading unit which can be said to include the detector 14 and which further includes a guide roller 31 mounted in the housing 1 and defining a portion of an elongated path along which the leader of film F must be advanced toward the core of the takeup reel, not shown. The film F is assumed to be stored in a cassette and the film threading unit is assumed to have means (such as a customary deflector and a belt or friction wheel) which can automatically withdraw the leader from a properly inserted cassette to thereupon advance the leader along the path defined in part by the detector 14 and roller 31. The extent to which the auxiliary actuating member 3 is to be turned in the direction indicated by arrow 30 in order to assume its operative position (see FIG. 2) and to thereby actuate the film threading unit is indicated by the angle alpha.

The operation:

Prior to putting the motion picture projector to use, the knob 2 and the second actuating member 3 respectively assume the neutral or starting and inoperative positions shown in FIG. 1. When a cassette with motion picture film is properly installed in or on the housing 1, the user turns the auxiliary actuating member 3 in a counterclockwise direction (arrow 30) to the operative position shown in FIG. 2. The spring 12 biases the carrier lever 13 in a clockwise direction so that the link 17 urges the bell crank lever 18 counterclockwise whereby the detent 19b automatically enters the notch 24 (second position of the bell crank lever) as soon as the actuating member 3 reaches the operative position of FIG. 2. The carrier lever 13 is free to pivot under the action of the spring 12 as soon as the notch 24 moves into register with the detent 19b because the illustrated lobe of the cam 6 holds the follower lever 7 against counterclockwise pivotal movement, i.e., the upper arm of the follower 7 is engaged by the stop 15 only when the detent 19b penetrates into the notch 24. The spring 12 is strong enough to insure that the bell crank lever 18 can hold the disk 23 against clockwise rotation under the action of the spring 27 which has been caused to store energy during rotation of the actuating member 3 from the inoperative position of FIG. 1 to that shown in FIG. 2.

Figure 2:
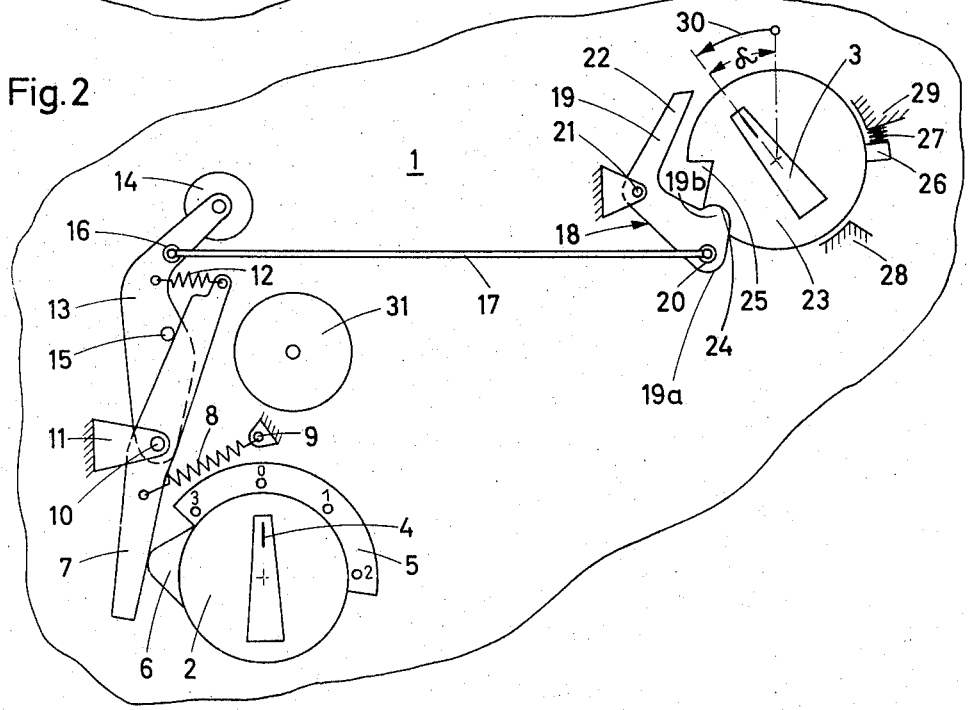
FIG. 2 illustrates the structure of FIG. 1 but with the second actuating means in operative position.

As soon as the actuating member 3 has been moved to the operative position of FIG. 2, the film threading unit begins to withdraw the leader of motion picture film F from the cassette and to advance the film along the predetermined path defined in part by the detector 14 and roller 31 so that the leader advances toward the takeup reel. The tension of film increases as soon as the leader is caught by and automatically attached to the core of the takeup reel whereby the tensioned portion of the film F acts upon the detector 14 and causes the carrier lever 13 to turn counterclockwise (see the arrow A in FIG. 3) so that the carrier lever causes the link 17 to pivot the bell crank lever 18 in a clockwise direction and to withdraw the detent 19b from the notch 24. The spring 27 is free to expand and returns the actuating member 3 to the inoperative position shown in FIG. 3. The blocking pallet 22 is then adjacent to but spaced apart from the notch 25 of the disk 23. Thus, the film threading unit is automatically arrested as soon as the leader of the film F is attached to the core of the takeup reel (i.e., as soon as the leader has been advanced through a predetermined distance) because the detector 14 then causes the link 17 to disengage the detent 19b of the bell crank lever 18 from the actuating member 3 which immediately reassumes its inoperative position under the action of the spring 27.

In order to initiate a normal operation of the projector, the user turns the knob 2 to a selected second position (e.g., to the second position shown in FIG. 4 in which the index 4 registers with the graduation 1 on the fixed scale 5) whereby the lobe of the cam 6 allows the spring 8 to pivot the follower lever 7 in a counterclockwise direction. The upper arm of the follower lever 7 engages the stop 15 and pivots the carrier lever 13 counterclockwise so that the link 17 pivots the bell crank lever 18 in a clockwise direction and causes the blocking pallet 22 to enter the notch 25 (see FIG. 4). Thus, the bell crank lever 18 assumes its first position in which the disk 23 is locked in the inoperative position of the actuating member 3 so that the film threading unit cannot be started unless the knob 2 is returned to the starting position of FIGS. 1, 2 or 3. The lobe of the cam 6 allows the follower lever 7 to assume the position of FIG. 4 regardless of whether the index 4 is moved into register with the graduation 1, 2, or 3 of the scale 5, i.e., as long as the knob 2 is moved from its starting position to change the setting of the motion picture projector from a first state (starting or neutral position of the knob 2) to a different second state (in which the index 4 registers with the graduation 1, 2 or 3 of the scale 5).

The parts 12, 13, 15, 17 can be said to constitute an operative connection between the follower lever 7 and the bell crank lever 18 including the blocking pawl 22. The purpose of the spring 12 of this operative connection is to effect a movement of the blocking pawl 22 from locking engagement with the disk 23 of the actuating member 3 in response to movement of the knob 2 back to the starting position of FIGS. 1, 2 or 3. The cam 6 then pivots the follower lever 7 clockwise and the spring 12 pivots the carrier lever 13 clockwise to cause the link 17 and bell crank lever 18 to withdraw the blocking pawl 22 from the notch 25. The link 17 causes the bell crank lever 18 to positively move the blocking pawl 22 into engagement with the disk 23 in response to such (counterclockwise) pivotal movement of the follower lever 7 which takes place under the action of the spring 8 on rotation of the knob 2 from the starting position of FIGS. 1, 2 or 3.

Figure 3:
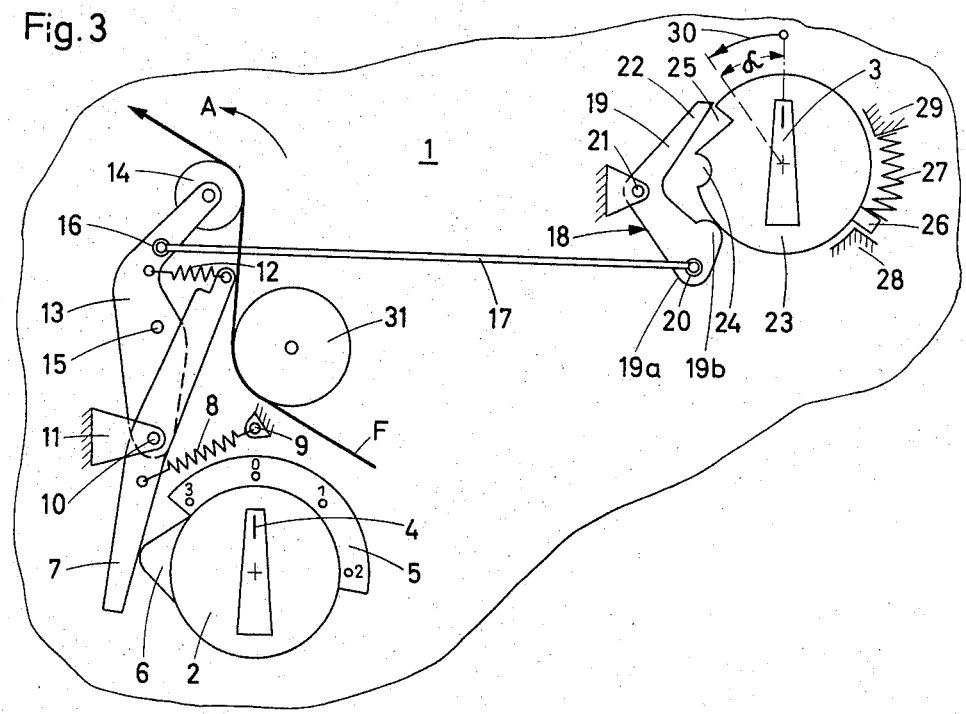
FIG. 3 illustrates the structure of FIGS. 1 or 2 with the second actuating means returned to its inoperative position in response to automatic completion of actuation of the film threading means.
Figure 4:
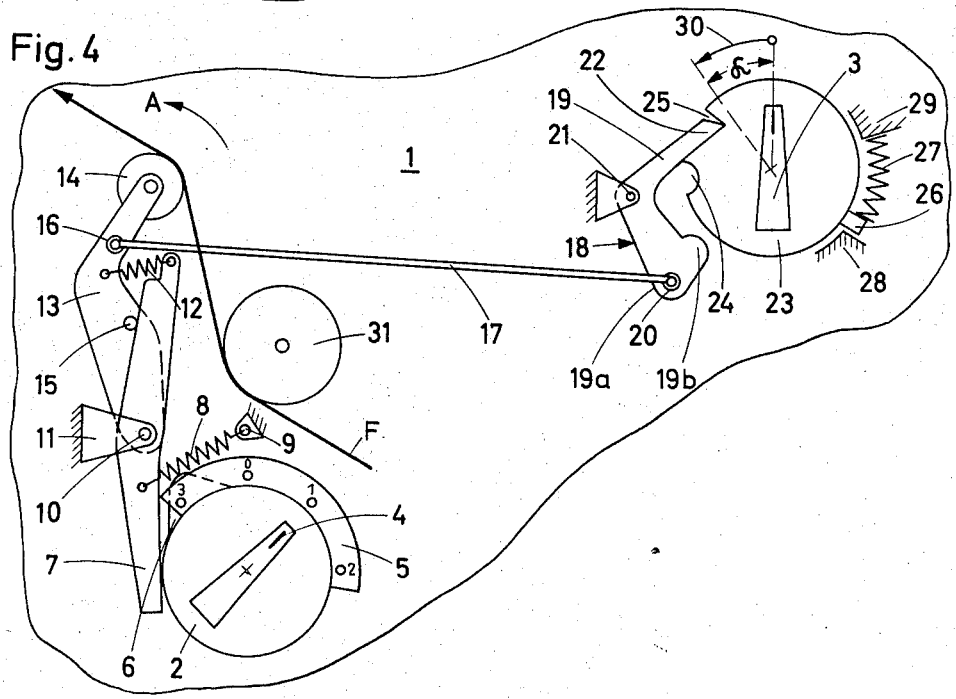
FIG. 4 illustrates the structure of FIGS. 1, 2 or 3 with the first actuating means out of its starting position whereby the blocking means holds the second actuating means against movement from its inoperative position.

If it should become necessary to interrupt the film threading operation for whatever reason before the film threading operation is terminated in automatic response to tensioning of film F and resulting pivoting of the carrier lever 13 from the position of FIG. 2 to the position of FIG. 3, the user simply rotates the second actuating member 3 by hand against the opposition of the spring 12 so that the actuating member 3 is moved from the operative position of FIG. 2 toward that shown in FIGS. 1, 3 or 4. This expels the detent 19b from the notch 24 so that the actuating member 3 returns to the inoperative position without any assistance from the user. The expulsion of the detent 19b from the notch 24 necessitates the exertion of a relatively small effort because the detent is rounded and the spring 12 is barely strong enough to hold the bell crank lever 18 in the angular position of FIG. 2 against the bias of the spring 27.

The levers 7 and 13 can be said to constitute a rigid unit as soon as the upper arm of the follower lever 7 reaches the stop 15 and the follower lever continues to turn in a counterclockwise direction. This insures that the blocking pallet 22 is compelled to enter the notch 25 and to thereby hold the second actuating member 3 against movement from the inoperative position as soon as the knob 2 is caused to leave its starting position. The spring 12 is effective only when the follower lever 7 is held against pivoting by the lobe of the cam 6 so that the spring 12 cannot interfere with the operation of spring 8, and vice versa. The spring 8 continuously urges the follower lever 7 to the position of FIG. 4 in which the blocking pawl 22 locks the actuating member 3 in its inoperative position.

If the knob 2 is rotated to leave its starting position while the detent 19b holds the actuating member 3 in the operative position of FIG. 2, the spring 8 contracts and the operative connection 15, 13, 17 between the follower lever 7 and the bell crank lever 19 expels the detent 19b from the notch 24 so that the actuating member 3 returns to its inoperative position under the action of the spring 27 and arrests the film threading unit. The blocking pawl 22 can penetrate into the notch 25 as soon as the actuating member 3 reaches its inoperative position.

A film threading unit which can be actuated by the second actuating member 3 is disclosed for example in U.S. Pat. No. 3,468,498 granted Sept. 23, 1969.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a cinematographic apparatus, particularly in a motion picture projector, a combination comprising first actuating means operable to change the setting of the apparatus from at least one first state to at least one second state; film threading means actuatable to transport the leader of motion picture film along a predetermined path; second actuating means independent of said first actuating means and movable from an inoperative position to an operative position to thereby actuate said film threading means; and blocking means responsive to operation of said first actuating means to thereby lock said second actuating means in said inoperative position so that said film threading means can be actuated only in said first state of the apparatus.

2. A combination as defined in claim 1, further comprising detent means for yieldably holding said second actuating means in said operative position, said second actuating means being movable by hand from said operative to said inoperative position thereof against the opposition of said detent means to thereby interrupt the actuation of said film threading means.

3. A combination as defined in claim 1, wherein the tension of motion picture film changes in response to transport of the leader through a predetermined distance along said path, and further comprising detent means for yieldably holding said second actuating means in said operative position, said film threading means comprising detector means responsive to changes in film tension upon completed transport of the leader through said distance and arranged to disengage said detent means so that said second actuating means is free to reassume said inoperative position and to thus terminate the actuation of said film threading means.

4. A combination as defined in claim 3, wherein said detent means forms part of said blocking means.

5. A combination as defined in claim 4, wherein said first actuating means is movable between a starting position corresponding to said first state of the apparatus and at least one additional position corresponding to said second state, and further comprising motion transmitting means operatively connecting said blocking means with said first actuating means so that said blocking means automatically locks said second actuating means in response to movement of said first actuating means from said starting position.

6. A combination as defined in claim 5, wherein said motion transmitting means comprises a mobile carrier and said film threading means comprises a film-engaging element provided on and movable with said carrier.

7. A combination as defined in claim 5, wherein said first actuating means is rotatable between said positions thereof and said motion transmitting means comprises a cam rotatable with said first actuating means, a follower arranged to track said cam, an operative connection between said follower and said blocking means, and means for biasing said follower against said cam, said biasing means being arranged to urge said follower to a position in which said blocking means locks said second actuating means in said inoperative position.

8. A combination as defined in claim 7, wherein said operative connection comprises resilient means.

9. A combination as defined in claim 8, wherein said resilient means is arranged to effect a movement of said blocking means from locking engagement with said second actuating means in response to movement of said first actuating means to said starting position.

10. A combination as defined in claim 9, wherein said operative connection further comprises link means arranged to positively move said blocking means into locking engagement with said second actuating means in response to such movement of said follower which takes place under the action of said biasing means on rotation of said first actuating means from said starting position.

11. A combination as defined in claim 1, wherein said second actuating means includes a rotary disk provided with a projection, and further comprising stop means located in the path of movement of said projection to arrest said disk in said inoperative position of said second actuating means, resilient means for biasing said second actuating means to said inoperative position, and detent means for yieldably holding said second actuating means in said operative position against the bias of said resilient means.

12. A combination as defined in claim 11, further comprising a supporting member for said blocking means and said detent means, said supporting member being movable between a first position in which said blocking means extends into a first recess of said disk in said inoperative position of said second actuating means and a second position in which said detent means extends into a second recess of said disk in said operative position of said second actuating means.

13. A combination as defined in claim 12, wherein said supporting member is a bell crank lever which is pivotable between said first and second positions thereof.

14. A combination as defined in claim 12, further comprising motion transmitting means provided between said first actuating means and said supporting member and arranged to move said supporting member to said first position in response to operation of said first actuating means, said first actuating means being movable between a starting position corresponding to said first state of the apparatus and at least one additional position corresponding to said second state of the apparatus and said motion transmitting means comprising a cam provided on said first actuating means and a follower arranged to track said cam and to effect the movement of said supporting member to said first position in response to movement of said first actuating means to said additional position.

15. A combination as defined in claim 14, wherein said motion transmitting means further comprises means for biasing said follower against said cam whereby said follower effects the movement of said supporting member to said second position when said second actuating means is moved to said operative position in the starting position of said first actuating means.

16. A combination as defined in claim 15, wherein said follower is a pivotable two-armed lever one arm of which abuts against said cam, said motion transmitting means further comprising a carrier pivotable with and relative to said follower, resilient coupling means connecting said carrier with the other arm of said follower, and link means articulately connecting said carrier with said supporting member.

17. A combination as defined in claim 16, wherein said film threading means comprises a roller provided on said carrier and arranged to move said supporting member by way of said link means from said second position in response to completed transport of the leader of motion picture film through a predetermined distance along said path.

18. A combination as defined in claim 17, wherein said carrier is a one-armed lever comprising a stop for the other arm of said follower, said other arm engaging said stop to thereby move said supporting member to said first position by way of said carrier and said link means in response to movement of said first actuating means from said starting position.

* * * * *